J. S. WEATHERS.
CALF WEANER.
APPLICATION FILED AUG. 6, 1910.
977,352.
Patented Nov. 29, 1910.
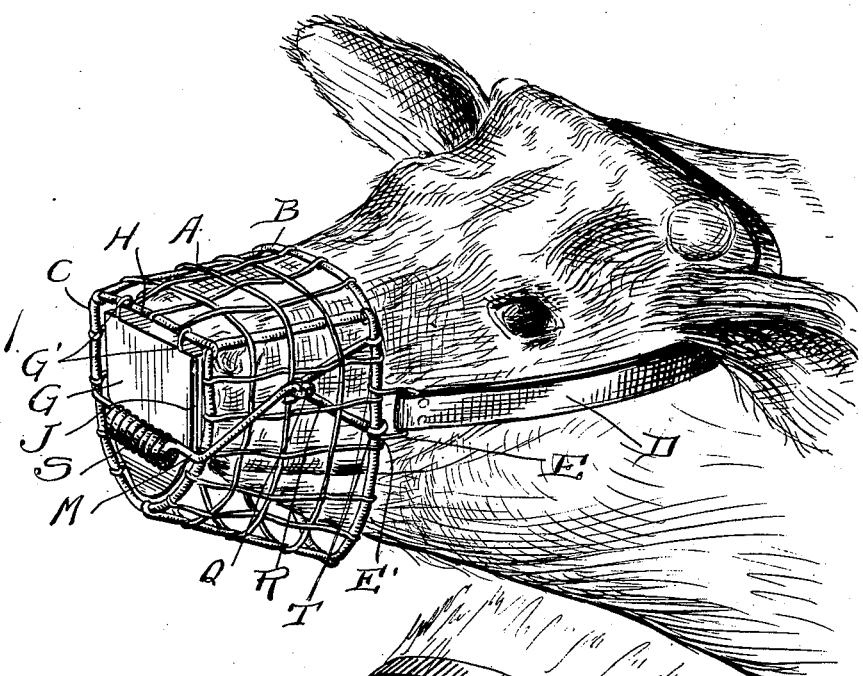
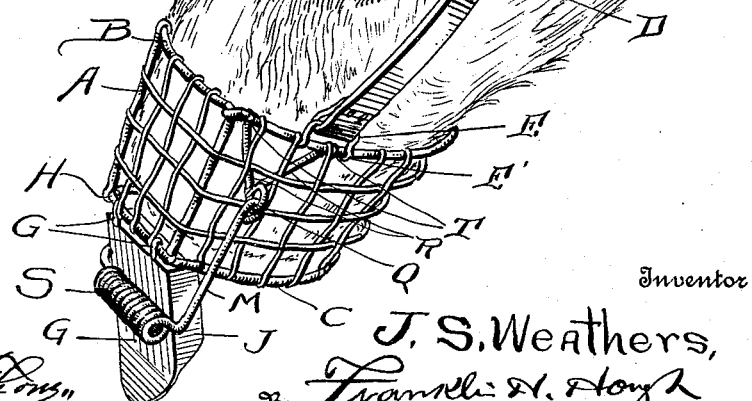

UNITED STATES PATENT OFFICE.

JOSEPH S. WEATHERS, OF WINDSOR, MISSOURI.

CALF-WEANER.

977,352.  Specification of Letters Patent. Patented Nov. 29, 1910.

Application filed August 6, 1910. Serial No. 575,864.

*To all whom it may concern:*

Be it known that I, JOSEPH S. WEATHERS, a citizen of the United States, residing at Windsor, in the county of Henry and State of Missouri, have invented certain new and useful Improvements in Calf-Weaners; and I do hereby declare the following to be a full, clear, and exact description of the invention such as will enable others skilled in the art to which it appertains to make and use the same, reference being had to the accompanying drawings, and to the letters and figures of reference marked thereon, which form a part of this specification.

This invention relates to new and useful improvements in muzzles for calf weaners and the object is to produce a simple and efficient device of this nature which will not interfere with the eating or drinking of the animal to which the device is applied.

The invention comprises various details of construction and combinations and arrangements of parts which will be hereinafter fully described and then specifically defined in the appended claims.

I illustrate my invention in the accompanying drawings, in which:—

Figure 1 is a perspective view showing the application of the invention to the head of an animal with the head raised, and Fig. 2 is a similar view showing the parts of the muzzle when the latter is lowered in the position they would assume when the animal is grazing.

Reference now being had to the details of the drawings by letter, A designates a frame of the muzzle having portions B and C adapted to surround the nose of the animal and provided with suitable mesh work of wire, and D is a strap for fastening the muzzle upon the head of the animal, said strap being fastened to the stirrup-shaped members E bent to form eyes E' which are pivotally connected to the wire B. The tapering end of the cage is open and normally closed by a door G, having eyes G' thereon which are pivotally mounted upon a wire H, forming a part of the frame of the muzzle, and said door has flanges J upon two of its opposite sides and rear, while the lower swinging end of the door is free and is slightly curved outwardly. Said side flanges are provided for the purpose of preventing the calf from sucking and the door swings freely within the opening formed within the wire C.

In order to insure the door being closed when the animal to which the muzzle is attached holds its head up, a bail-shaped member M is provided having eyes at its ends which engage eyes Q formed in the wire R, the arms of which diverge and have eyes T at their ends engaging the wire B. Said bail has a portion thereof turned to form a coil S which normally rests, when the head of the animal is raised with the muzzle, against the door but said bail is so arranged that, when the muzzle is tilted down, which would be the position it assumes when a calf or other animal equipped with the device is grazing or drinking, it will swing forward as will also the door and not interfere with the animal's eating or drinking.

What I claim to be new is:—

1. A muzzle for weaning calves, etc., comprising a cage adapted to fit onto the head of the animal and provided with an opening at its tapering end, a door hinged to the tapering end and adapted to swing within said opening and provided with flanges upon its edges for the purpose set forth, and a swinging gravity bail-shaped member adapted to hold the door closed when the muzzle is held in a horizontal position.

2. A muzzle for weaning calves, etc., comprising a cage adapted to fit onto the head of the animal and provided with an opening at its tapering end, a door hinged to the tapering end and adapted to swing within said opening and provided with flanges upon its edges for the purpose set forth, a bail-shaped member having eyes at its ends, wires secured to the frame of the muzzle and to which said bail-shaped member is pivoted, the latter bent to form a coil and adapted to engage the free end of the door.

In testimony whereof I hereunto affix my signature in the presence of two witnesses.

JOSEPH S. WEATHERS.

Witnesses:
J. W. FLIPPIN,
O. LAISURE.